US012118772B2

(12) United States Patent
Gao et al.

(10) Patent No.: US 12,118,772 B2
(45) Date of Patent: Oct. 15, 2024

(54) HUMAN ACTIVITY RECOGNITION FUSION METHOD AND SYSTEM FOR ECOLOGICAL CONSERVATION REDLINE

(71) Applicant: Satellite Application Center for Ecology and Environment, MEE, Beijing (CN)

(72) Inventors: Jixi Gao, Beijing (CN); Wenming Shen, Beijing (CN); Mingyong Cai, Beijing (CN); Xinsheng Zhang, Beijing (CN); Wenfei Tai, Beijing (CN); Xuewei Shi, Beijing (CN); Xuhui Chen, Beijing (CN); Sihan Liu, Beijing (CN); Tong Xiao, Beijing (CN); Wandong Ma, Beijing (CN); Jing Li, Beijing (CN); Yuanli Shi, Beijing (CN); Lixia Wang, Beijing (CN); Hongwei Zhang, Beijing (CN); Zhihua Ren, Beijing (CN)

( * ) Notice: Subject to any disclaimer, the term of this patent is extended or adjusted under 35 U.S.C. 154(b) by 342 days.

(21) Appl. No.: 17/687,664

(22) Filed: Mar. 6, 2022

(65) Prior Publication Data
US 2022/0309772 A1 Sep. 29, 2022

(30) Foreign Application Priority Data
Mar. 25, 2021 (CN) .......................... 202110321846.5

(51) Int. Cl.
G06V 20/52 (2022.01)
G06V 10/762 (2022.01)
G06V 10/80 (2022.01)
G06V 10/82 (2022.01)
G06V 40/20 (2022.01)

(52) U.S. Cl.
CPC .......... *G06V 10/803* (2022.01); *G06V 10/762* (2022.01); *G06V 10/806* (2022.01); *G06V 10/82* (2022.01); *G06V 20/52* (2022.01); *G06V 40/20* (2022.01)

(58) Field of Classification Search
CPC .... G06V 10/80; G06V 10/803; G06V 10/806; G06V 20/52; G06V 40/20; G06V 10/762; G06V 10/82; G06T 2207/10032
See application file for complete search history.

(56) References Cited

FOREIGN PATENT DOCUMENTS

CN 109325085 B * 11/2019 ........... G06K 9/0063

* cited by examiner

*Primary Examiner* — Sumati Lefkowitz
*Assistant Examiner* — Michael Adam Shariff

(57) ABSTRACT

A human activity recognition fusion method and system for ecological protection red line is disclosed. The method includes: obtaining a pre-stage remote sensing image and a post-stage remote sensing image of a target ecological protection red line region, and performing a data pre-processing; inputting the pre-processed pre-stage remote sensing image and the post-stage remote sensing image into a human activity recognition model after a pre-training; identifying a human activity pattern of the target ecological protection red line region as a first detection result; segmenting, calculating and analyzing the latest image data corresponding to the target ecological protection red line region based on a geographical country situation data to obtain a change pattern as a second detection result; and fusing the first detection result and the second detection result to obtain a change detection pattern of the target ecological protection red line region.

7 Claims, 4 Drawing Sheets

HUMAN ACTIVITY RECOGNITION FUSION METHOD AND SYSTEM FOR ECOLOGICAL CONSERVATION REDLINE

TECHNICAL FIELD

The present disclosure relates to the technical field of geographic information and remote sensing application technology, and more specifically, to a human activity recognition fusion method and system for ecological protection red line.

BACKGROUND ART

Ecological protection red line has many types and large scope. Human activities are complex and diverse. And different red line regions need different attentions. It is difficult to achieve a certain identification accuracy simply relying on a single data source and a single identification method. The diversity of human activities makes the information expression of human activities extremely complex. At the same time, the difference between human activity information and natural information is that human activity information is seriously fragmented and has many scenes, so it is difficult to analyze and extract category information based on traditional methods.

The process of human activity change detection based on remote sensing images is very complex, involving several links such as image pre-processing, threshold segmentation, characteristic extraction, image segmentation and classification. At present, no change detection processes and methods are generally considered to have absolute advantages, and the problems and theories solved by multi number algorithms are still relatively scattered.

Therefore, how to solve the problems of low regional adaptability and poor accuracy of a single technical method and improve the level of automatic recognition of human activities is an urgent problem for peer practitioners.

SUMMARY

In view of the above, the disclosure provides a human activity recognition fusion method and system for ecological protection red line. By fusing artificial intelligence and full sample change detection method, the method can solve the problems of low regional adaptability and poor accuracy of single technical method.

In order to achieve the above purpose, technical solutions of the present disclosure are specifically described as follows.

A first aspect of the disclosure is to provide a human activity recognition fusion method for ecological protection red line, including the steps as follows.

A pre-stage remote sensing image and a post-stage remote sensing image of a target ecological protection red line region are obtained, and a data pre-processing is performed.

The pre-processed pre-stage remote sensing image and the post-stage remote sensing image are input into a human activity recognition model after a pre-training. The human activity recognition model uses multiple sets of data training, the multiple sets of data include: pre-stage images and post-stage images of a red line region. And the post-stage images carry a human activity annotation.

A human activity pattern of the target ecological protection red line region is identified as a first detection result.

The latest image data corresponding to the target ecological protection red line region is segmented, calculated and analyzed based on a geographical country situation data to obtain a change pattern as a second detection result.

The first detection result and the second detection result are fused to obtain a change detection pattern of the target ecological protection red line region.

Further, a construction process of the human activity recognition model includes the steps as follows.

A pre-phase remote sensing image and a post-phase remote sensing image of the ecological protection red line region are obtained. The pre-phase remote sensing image is natural surface coverage. The post-phase remote sensing image is a surface with traces of human activities, and is marked with an outlining human activity annotation.

A data pre-processing is performed on the pre-phase remote sensing image and the post-phase remote sensing image of the ecological protection red line region.

The human activity annotation vector data is rasterized, and cutting processing is performed on the data of the pre-phase remote sensing image and the post-phase remote sensing image to obtain a paired tile sample data set.

The tile sample data set is divided into a training set and a verification set according to a preset ratio.

A deep convolutional neural network model is constructed. Characteristic extraction is performed respectively on the input of the pre-phase remote sensing image and the post-phase remote sensing image. And then multi-scale splicing is performed.

Iterative training and verification are performed on the deep convolutional neural network model using the training set and the verification set.

The human activity recognition model is obtained after an evaluation prediction result of the trained deep convolutional neural network model satisfies a preset condition.

Further, the data pre-processing includes: descending processing and wavelength band reassembling on the remote sensing images.

The descending processing includes the steps as follows. A bit depth is stretched to 8 bits. And the wavelength band reassembling includes the steps as follows. 3, 2 and 1 wavelength bands are selected as red, green and blue true color image data if the image is a four wavelength band data.

Further, the human activity annotation includes: interpretation marks for residential areas, mining land, transportation land, water conservancy and hydropower facilities and energy facilities.

Further, the deep convolutional neural network model adopts a UNet++ structure and selects a ResNet50-D backbone network. And in the training process, the loss function is a Focal loss loss function.

Further, the latest image data corresponding to the target ecological protection red line region is segmented, calculated and analyzed based on a geographical country situation data to obtain a change pattern as a second detection result, including the steps as follows.

A guidance segmentation is performed on the latest image data corresponding to the target ecological protection red line region based on the geographical country situation data.

Spectral and geometric characteristics of each segmented pattern are calculated, and the change pattern is obtained by clustering analysis and quartile spacing method as the second detection result.

Further, spectral and geometric characteristics of each segmented pattern are calculated, and the change pattern is obtained by clustering analysis and quartile spacing method as the second detection result, including the steps as follows.

A k-means algorithm is selected as a clustering algorithm. A similarity analysis is adopted to analyze factors of several characteristic parameters, and X most heterogeneous characteristics are selected from multiple characteristics to characterize the change.

A median M of X characteristic parameters is calculated. A bit number Xa at 25% is found forward along the median M, and a bit number Xb at 75% is found backward. And a quadratic difference Mk=Xb−Xa.

Values less than M−3*Mk and greater than M+3*Mk are taken as a deviating region to obtain a change pattern of full sample.

Further, the first detection result and the second detection result are fused to obtain a change detection pattern of the target ecological protection red line region, including the steps as follows.

The first detection result and the second detection result are analyzed. If the two are on a same order of magnitude which indicates that the detection results are similar, a union is taken as a final change detection result.

If the two are not on a same order of magnitude, an intersection is taken as a final change detection result.

A second aspect of the disclosure is to provide a human activity recognition fusion system for ecological protection red line, including:

an obtaining pre-processing module, configured to obtain a pre-stage remote sensing image and a post-stage remote sensing image of a target ecological protection red line region, and to perform a data pre-processing;

an input module, configured to input the pre-processed pre-stage remote sensing image and the post-stage remote sensing image into a human activity recognition model after a pre-training, wherein the human activity recognition model uses multiple sets of data training, the multiple sets of data include: a pre-stage image and a post-stage image of a red line region, the post-stage image carries a human activity annotation;

an identification module, configured to identify a human activity pattern of the target ecological protection red line region as a first detection result;

an analyzing and processing module, configured to segment, calculate and analyze the latest image data corresponding to the target ecological protection red line region based on a geographical country situation data to obtain a change pattern as a second detection result;

a fusing module, configured to fuse the first detection result and the second detection result to obtain a change detection pattern of the target ecological protection red line region.

Compared with the prior art, the disclosure has the following beneficial effects.

For the human activity recognition fusion method for ecological protection red line provided by the embodiment of the disclosure:

(1) The strategy based on the integration of deep learning method and full sample method is used to identify human activities within the ecological protection red line. Compared with the traditional single identification method and single data source, it improves the extraction accuracy, effectively reduces the amount of manual work in the later stage, and greatly improves the production efficiency.

(2) The disclosure fully combines the deep learning automatic extraction technology and the traditional statistical knowledge information, gives play to their advantages, improves the accuracy level of automatic recognition of human activities, and makes it reach the business production level.

Other features and advantages of the disclosure will be described in the following description, and will become apparent in part from the description, or will be understood by implementing the disclosure. The object and other advantages of the disclosure can be realized and obtained by the structure specially pointed out in the description, claims and drawings.

The technical scheme of the disclosure is further described in detail below through the accompanying drawings and embodiments.

BRIEF DESCRIPTION OF THE DRAWINGS

The accompanying drawings are intended to provide a further understanding of the disclosure and form part of the description. Together with the embodiments of the disclosure, they are used to explain the disclosure and do not constitute a limitation of the disclosure. In the attached drawings.

DETAILED DESCRIPTION OF THE EMBODIMENTS

Exemplary embodiments of the present disclosure will be described in more detail below with reference to the accompanying drawings. Although exemplary embodiments of the present disclosure are shown in the accompanying drawings, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

Figure 1:
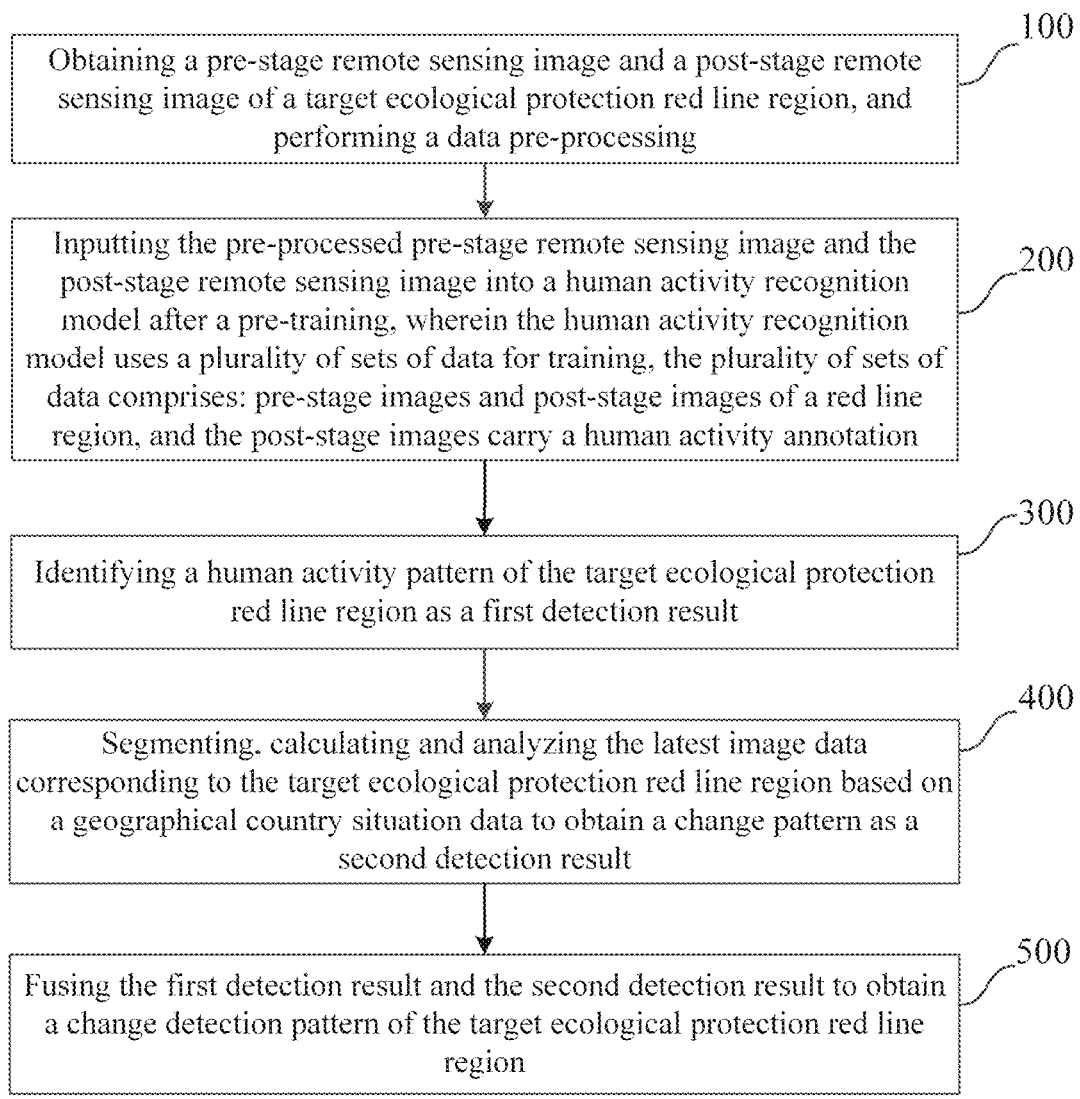
FIG. 1 is the flow chart of human activity recognition fusion method for ecological protection red line provided by the embodiment of the disclosure.

The disclosure provides a human activity recognition fusion method for ecological protection red line. As shown in FIG. 1, the method includes the steps as follows.

S100: obtaining a pre-stage remote sensing image and a post-stage remote sensing image of a target ecological protection red line region, and performing a data pre-processing;

S200: inputting the pre-processed pre-stage remote sensing image and the post-stage remote sensing image into a human activity recognition model after a pre-training, wherein the human activity recognition model uses multiple sets of data training, the multiple sets of data include: pre-stage images and post-stage images of a red line region, and the post-stage image carry a human activity annotation;

S300: identifying a human activity pattern of the target ecological protection red line region as a first detection result;

S400: segmenting, calculating and analyzing the latest image data corresponding to the target ecological protection red line region based on a geographical country situation data to obtain a change pattern as a second detection result;

S500: fusing the first detection result and the second detection result to obtain a change detection pattern of the target ecological protection red line region.

By integrating artificial intelligence with full sample change detection method, this method solves the problems of low regional adaptability and poor accuracy of single technical method, and improves the level of automatic recognition of human activities. The disclosure adopts the strategy based on the integration of deep learning method and full sample method to identify human activities within the ecological protection red line, which improves the extraction accuracy, effectively reduces the amount of manual work in the later stage and greatly improves the production efficiency compared with the traditional single identification method and single data source.

In addition, the disclosure fully combines the deep learning automatic extraction technology and the traditional statistical knowledge information, gives full play to their advantages, improves the accuracy level of automatic recognition of human activities, and makes it reach the level of business production.

The above steps are described in detail below.

Figure 2:
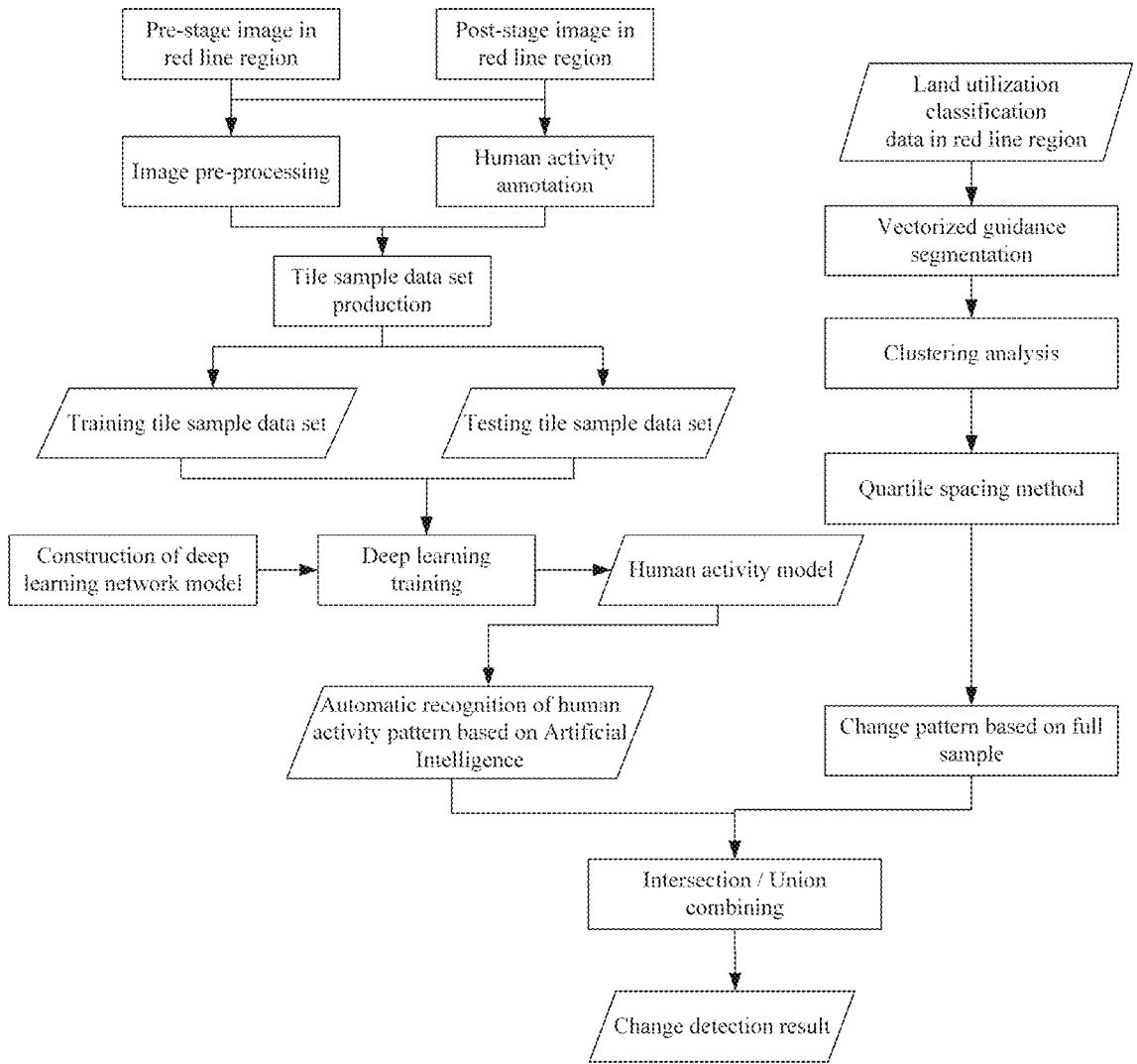
FIG. 2 is the schematic diagram of human activity recognition fusion method for ecological protection red line provided by the embodiment of the disclosure.

In one embodiment, the construction process of the human activity recognition model in the above step S200, as shown in the left half of FIG. 2, includes the following steps.

S1: establishing the interpretation marks of human activities within the ecological protection red line, using the remote sensing image data to combine the monitoring image pairs before and after the period according to the monitoring phase, and outlining the vector marks of human activities. That is, the pre-phase remote sensing image is natural surface coverage, the post-phase remote sensing image is a surface with traces of human activities, so as to obtain the image pairs and vector marks of human activities.

S2: pre-processing the remote sensing images before and after human activities, including descending processing. Its bit depth is stretched to 8 bits. And wavelength band reassembling. If the image is a four wavelength band data, 3, 2 and 1 wavelength bands are selected as red, green and blue true color image data.

S3: rasterizing the human activity annotation vector data, and performing cutting processing on the data of the pre-phase remote sensing image and the post-phase remote sensing image to obtain a paired tile sample data set.

S4: dividing the tile sample data set into a training set and a verification set according to a ratio of 7:3. The verification set samples are required to include typical sample types.

S5: constructing a deep convolutional neural network model. adopting the UNET++ structure, selecting the ResNet50-D backbone network to design the human activity recognition model, extracting the characteristics of the input images in the early and late stages respectively, and then conducting multi-scale splicing to form the human activity recognition network model.

S6: conducting network training. The training set samples in step S4 are enhanced and input into the network model designed in step S5, and the training parameters such as loss function, setting learning rate, iterative step size, number of rounds and training termination strategy are selected for iterative training. After the training, a preliminary human activity recognition model is obtained.

S7: preparing independent test image data, using the human activity recognition model obtained in step S6 to predict the test image, evaluating the accuracy, missed detection rate, recall rate and other indicators of the prediction results, generating samples for the prediction image that fails to meet the indicators according to step S2-S4, and adding them to the existing training set and verification set for training in step S6 to obtain the optimized human activity recognition model.

Referring to FIG. 2, in the right half of the figure, the full sample change detection process includes the following steps.

S8: obtaining the result of automatic recognition of human activity pattern based on artificial intelligence based on the model obtained in above step S7.

S9: performing a vectorized guidance segmentation to obtain the segmented image blocks based on the corresponding geographical country situation and the latest remote sensing image data according to the business requirements of human activity monitoring;

S10: performing the clustering analysis on the segmented image blocks based on the geographical country situation data of the same category. The abnormal patterns deviate from the center of the category. The typical characteristics are obtained according to the similarity analysis, and the change patterns of the full sample are obtained according to the quartile spacing method.

S11: carrying out the pattern fusion in the way of technical fusion to obtain the final change detection result based on the change pattern obtained in step S8 and the change patterns obtained in step S10.

In steps S1-S7, after obtaining the optimized human activity recognition model, the pre-stage remote sensing image and the pre-stage remote sensing image of the target ecologically protected red line region are taken as inputs. Combining the full sample change detection process of steps S8-S10, finally the pattern fusion is performed in the way of technical fusion in step S11 to obtain a final change detection result.

The human activity recognition fusion method for ecological protection red line, provided by the embodiments of the present disclosure includes: 1) obtaining a change detection result based on a technical method of artificial intelligence, mainly establishing a human activity interpretation marks, and performing vector annotation; pre-processing the pre-stage remote sensing image and the pre-stage remote sensing image of human activity; cutting the annotation result to obtain samples; dividing the tile sample data sets into a training set and a verification set; constructing a deep convolutional neural network model; network training facing human activity; and model testing and sample expansion;

2) obtaining a change detection result based on a technology method of a full sample, mainly performing guidance segmentation on the latest image data based on geographical country situation data; calculating spectral and geometric characteristics of each segmented pattern; recognizing a change pattern by clustering analysis and quartile spacing method; and 3) performing pattern fusion on the recognition result by taking an intersection to obtain a final change detection pattern. The present method sufficiently achieves the advantages of multiple data sources and multiple technical methods, and the extraction accuracy is relatively high compared with the conventional method.

The technical scheme of the disclosure is described in detail below through more detailed embodiment steps.

Referring to FIG. 2, there is shown a fast recognition technology flow of human activity recognition fusion method for ecological protection red line in the present disclosure. The method does not limit the manner of obtaining remote sensing images, and may be an avionics picture and a satellite photograph, and the source is a resource satellite application center, Google Earth software or a field real-time photographing. For example, a remote sensing image of a target region may be obtained by an unmanned aerial vehicle imaging apparatus. When in a specific implementation, the remote sensing image is mainly applicable to high-resolution satellite remote sensing image data with an m-level, and relates to satellite images such as GF6, GF1, BCD, GF7, GF1, GF2, and ZY3. Some simple processing is required for the obtained remote sensing images, such as radiation scaling, rectification, atmospheric correction, projection conversion and image cropping processing operations.

S1 establishing the interpretation marks of human activities within the ecological protection red line, using the remote sensing image data to combine the monitoring image pairs before and after the period according to the monitoring phase, and outlining the vector marks of human activities. That is, the pre-phase remote sensing image is natural surface coverage, the post-phase remote sensing image is a surface with traces of human activities, so as to obtain the image pairs and vector marks of human activities.

S1.1 establishing interpretation marks of human activity within ecological protection red line, including interpretation marks for residential areas, mining land, transportation land, water conservancy and hydropower facilities and energy facilities and the like.

S1.2 using existing remote sensing image vector collecting software, using the remote sensing image data to combine the monitoring image pairs before and after the period according to the monitoring phase, and outlining the vector marks of human activities.

S2 pre-processing the remote sensing images before and after human activities, including descending processing. Its bit depth is stretched to 8 bits, and wavelength band reassembling. If the image is a four wavelength band data, red, green and blue bands are selected to reassemble into true color image data.

S2.1 using linear stretching with exponential coefficients for descending treatment and stretching the output image bits to 8 bits.

S2.2 selecting red, green and blue bands to reassemble into true color image data for wavelength band reassembling.

S3 rasterizing the human activity annotation vector data, and performing cutting processing on the data of the pre-phase remote sensing image and the post-phase remote sensing image to obtain a paired tile sample data set.

S3.1 rasterizing vector data and vectorizing into 1 to category number respectively according to human activity category.

S3.2 tile cut size being 512*512, and the effective occupancy ratio of the label being 0.001;

S4 dividing the tile sample data set into a training set and a verification set according to a ratio of 7:3. The verification set samples are required to include typical sample types.

Figure 3:
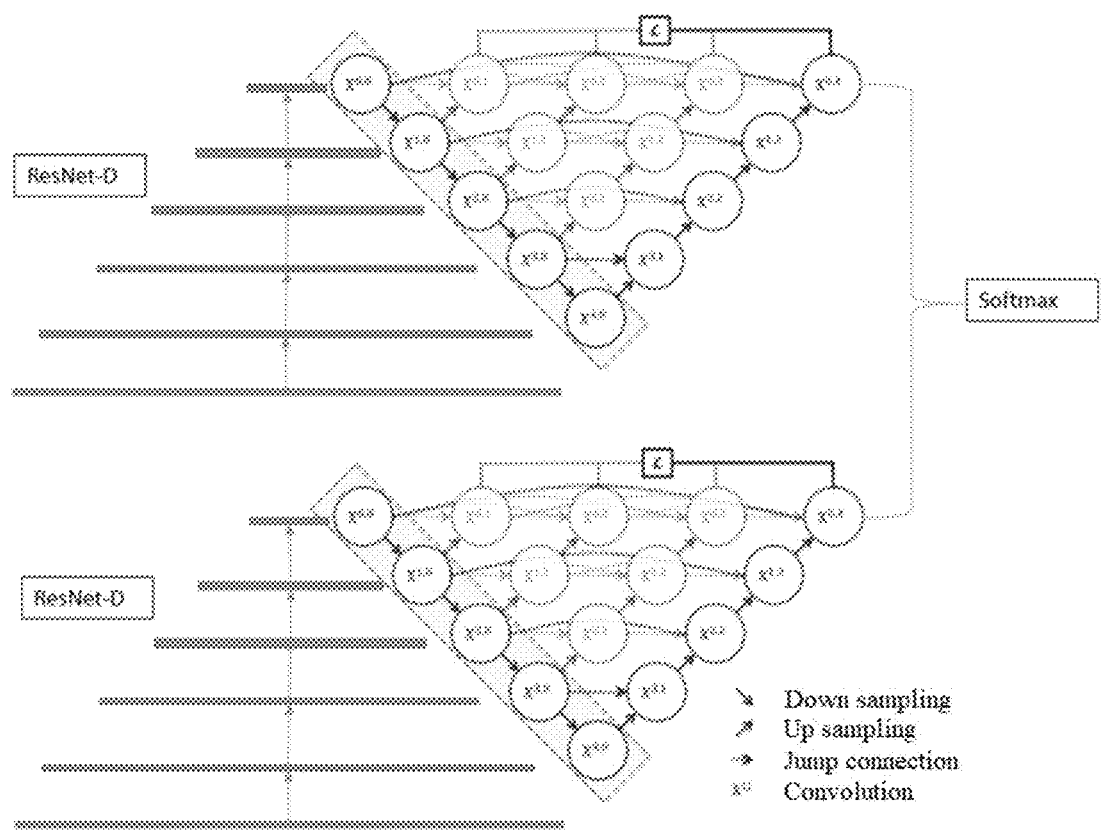
FIG. 3 is a structural diagram of a deep convolutional neural network model provided by an embodiment of the present disclosure.

S5 constructing a deep convolutional neural network model. adopting the UNET++ structure, selecting the ResNet50-D backbone network to design the human activity recognition model, extracting the characteristics of the input images in the early and late stages respectively, and then conducting multi-scale splicing to form the human activity recognition network model, as shown in FIG. 3.

S6 conducting network training. The training set samples in step S4 are enhanced and input into the network model designed in step S5, and the training parameters such as loss function, setting learning rate, iterative step size, number of rounds and training termination strategy are selected for iterative training. After the training, a preliminary human activity recognition model is obtained.

S6.1 Selecting Focal loss lost function as a lost function.

S6.2 setting initial learning rate as 0.001, setting batch_size as 16, and setting the iteration step as a larger value in the number of samples/batch_size or 1000, and setting the number of rounds as 100.

S6.3 setting training termination policy as 0.1 times learning rate attenuation policy, and setting the minimum learning rate as 0.000001.

S7 preparing independent test image data, using the human activity recognition model obtained in step S6 to predict the test image, evaluating the accuracy, missed detection rate, recall rate and other indicators of the prediction results, generating samples for the prediction image that fails to meet the indicators according to step S2-S4, and adding them to the existing training set and verification set for training in step S6 to obtain the optimized human activity recognition model.

S7.1 the types of the prediction result including TP (true positive example), TN (true negative example), FP (false positive example), and FN (false negative example).

S7.2 Accuracy=(TP+TN)/(P+N), leakage detection rate=1−TP/(FP+FN), recall rate=TP/(FP+FN). Thresholds of accuracy, leakage detection rate and recall rate can be properly established according to specific prediction conditions.

S8 obtaining the results of automatic recognition of human activity patterns based on artificial intelligence based on the two periods of high-resolution remote sensing images, combined with the operation of the model obtained in step S7;

S9 synchronously preparing matching land utilization data according to the time of the previous remote sensing image, and performing a vectorized guidance segmentation;

S9.1 selecting geographical country situation data from the land utilization classification data to ensure that the resolution is better than 5 meters and the images have the same coordinate system;

S9.2 selecting non-human activity types such as trauma, garden, forestry, and grass from land utilization classification data and performing the vectorized guidance segmentation. The segmentation method is selected as Lambda, the segmentation parameter is set to 50, and the segmentation threshold is set to 5.

S10 taking data of the same type of land as a reference, performing clustering analysis based on the segmented image blocks, and searching for abnormal patterns.

S10.1 selecting a k-average (k-means) algorithm as the clustering algorithm. Most of the patterns should be distributed within a certain range, and the discrete distributed points outside the range can be considered as the change image patterns.

S10.2 adopting similarity analysis to analyze factors of several characteristic parameters, and picking X characteristic changes with maximum heterogeneity from multiple characteristics to characterize the change.

S10.3 calculating a median M of X characteristic parameters, finding a bit number Xa at 25% forward along the median M, finding a bit number Xb at 75% backward, and a quadratic difference Mk=Xb−Xa; taking values less than M−3*Mk and greater than M+3*Mk as a deviating region to obtain a change pattern of full sample.

S11 carrying out the pattern fusion in the way of technical fusion to obtain the final change detection result based on the change pattern obtained in step S8 and the change patterns obtained in step S10.

S11.1 analyzing the change patterns obtained from the first detection result and the second detection result. If the change patterns are on the same order of magnitude, for example, the number of the patterns of the first detection result is 100, and the number of the patterns of the second detection result is 120, it indicates that the detection results are similar, and the union is taken as the final change detection result.

S11.2 analyzing the change patterns obtained from the first detection result and the second detection result. If the change patterns are not on a same order of magnitude, for example, the number of the patterns of the first detection result is 100, and the number of the patterns of the second detection result is 1000, it indicates that the detection results are relatively different, and the intersection is taken as the final change detection result.

Figure 4:
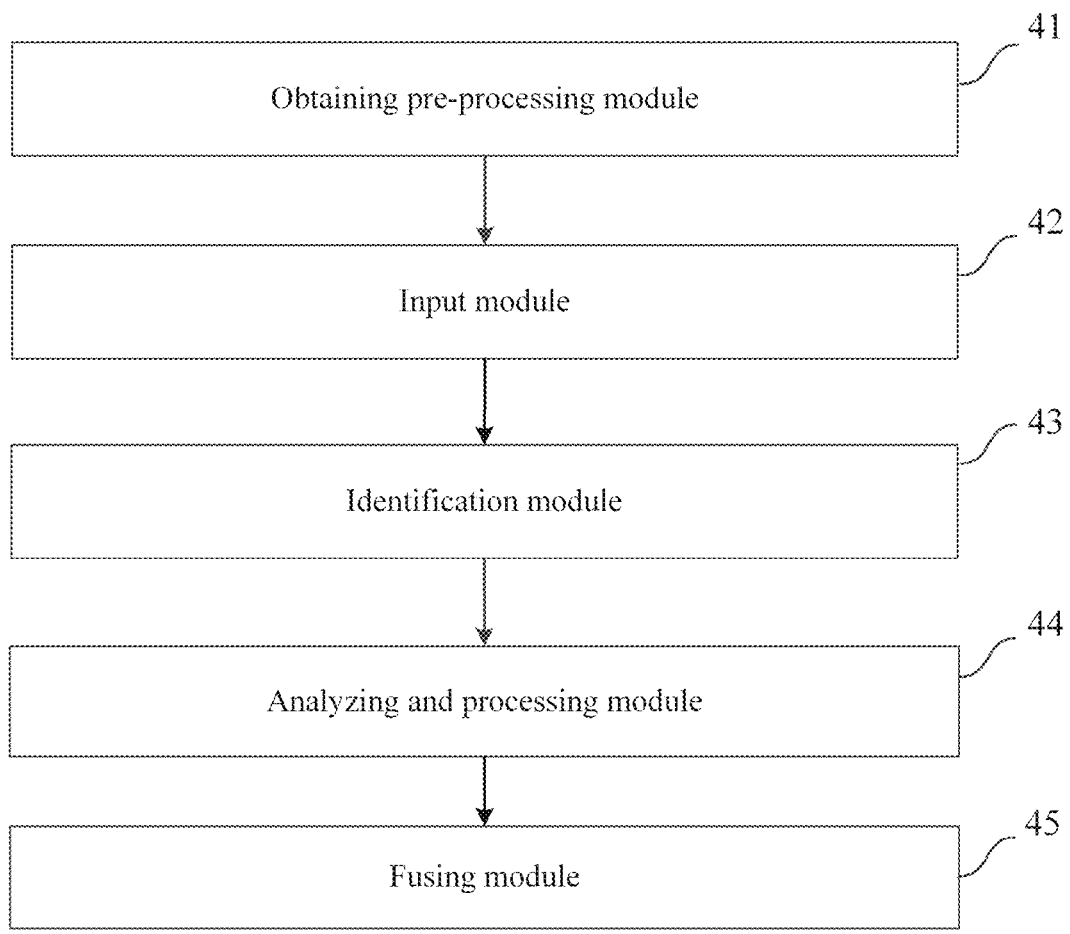
FIG. 4 is a block diagram of a human activity recognition fusion system for ecological protection red line provided by the embodiment of the disclosure.

Based on the same inventive concept, an embodiment of the present disclosure further provides a human activity recognition fusion system for ecological protection red line as shown in FIG. 4, including:

an obtaining pre-processing module 41, configured to obtain a pre-stage remote sensing image and a post-stage remote sensing image of a target ecological protection red line region, and to perform a data pre-processing;

an input module 42, configured to input the pre-processed pre-stage remote sensing image and the post-stage remote sensing image into a human activity recognition model after a pre-training. The human activity recognition model uses multiple sets of data training, the multiple sets of data include: a pre-stage image and a post-stage image of a red line region, the post-stage image carries a human activity annotation.

an identification module 43, configured to identify a human activity pattern of the target ecological protection red line region as a first detection result.

an analyzing and processing module 44, configured to segment, calculate and analyze the latest image data corresponding to the target ecological protection red line region based on a geographical country situation data to obtain a change pattern as a second detection result.

a fusing module 45, configured to fuse the first detection result and the second detection result to obtain a change detection pattern of the target ecological protection red line region.

Since the principle of the problem solved by the system is similar to the above-mentioned human activity recognition fusion method for ecological protection red line, the implementation of the system can refer to the implementation of the above-mentioned method, and the repetition will not be repeated.

Obviously, those skilled in the art can make various changes and modifications to the disclosure without departing from the spirit and scope of the disclosure. Thus, if these modifications and variants of the disclosure fall within the scope of the claims of the disclosure and its equivalent technology, the disclosure is also intended to include these modifications and variants.

What is claimed is:

1. A human activity recognition fusion method for ecological protection red line, comprising:
    obtaining a pre-stage remote sensing image and a post-stage remote sensing image of a target ecological protection red line region, and performing a data pre-processing;
    inputting the pre-processed pre-stage remote sensing image and the post-stage remote sensing image into a human activity recognition model after a pre-training, wherein the human activity recognition model uses a plurality of sets of data for training, the plurality of sets of data comprises: pre-stage images and post-stage images of a red line region, and the post-stage images carry a human activity annotation;
    identifying a human activity pattern of the target ecological protection red line region as a first detection result;
    segmenting, calculating and analyzing a latest image data corresponding to the target ecological protection red line region based on a geographical country situation data to obtain a change pattern as a second detection result, comprising:
    performing a guidance segmentation on the latest image data corresponding to the target ecological protection red line region based on the geographical country situation data;
    calculating spectral and geometric characteristics of each segmented pattern, and obtaining the change pattern by clustering analysis and quartile spacing method as the second detection result;
    fusing the first detection result and the second detection result to obtain a change detection pattern of the target ecological protection red line region;
    wherein, the step of calculating spectral and geometric characteristics of each segmented pattern, and obtaining the change pattern by clustering analysis and quartile spacing method as the second detection result specifically comprises:
    selecting a K-means algorithm as a clustering algorithm,
    adopting a similarity analysis to analyze factors of several characteristic parameters, and selecting X most heterogeneous characteristics from a plurality of characteristics to characterize the change;
    calculating a median M of parameters of the most heterogeneous characteristics, finding a value Xa at 25% forward from the median M,
    finding a value Xb at 75% backward from the median, and a quadratic difference Mk=Xb−Xa;
    taking values less than M−3*Mk and greater than M+3*Mk as a deviating region to obtain a change pattern of full sample.

2. The method of claim 1, wherein a construction process of the human activity recognition model comprises:
    obtaining a pre-phase remote sensing image and a post-phase remote sensing image of the ecological protection red line region, wherein the pre-phase remote sensing image is natural surface coverage, the post-phase remote sensing image is a surface with traces of human activities, and is marked with an outlining human activity annotation;
    performing data pre-processing on the pre-phase remote sensing image and the post-phase remote sensing image of the ecological protection red line region;
    rasterizing the human activity annotation vector data, and performing cutting processing on the data of the pre-phase remote sensing image and the post-phase remote sensing image to obtain a paired tile sample data set;
    dividing the tile sample data set into a training set and a verification set according to a preset ratio;
    constructing a deep convolutional neural network model, performing characteristic extraction respectively on the input of the pre-phase remote sensing image and the post-phase remote sensing image, and then performing multi-scale splicing;

using the training set and the verification set to perform iterative training and verification on the deep convolutional neural network model; and obtaining the human activity recognition model after an evaluation prediction result of the trained deep convolutional neural network model satisfies a preset condition.

3. The method of claim 1, wherein the data pre-processing comprises: descending processing and wavelength band reassembling on the remote sensing images;

wherein, the descending processing comprises: stretching a bit depth to 8 bits; and the wavelength band reassembling comprises: selecting 3, 2 and 1 wavelength bands as red, green and blue true color image data if the image is a four wavelength band data.

4. The method of claim 1, wherein the human activity annotation comprises: interpretation marks for residential areas, mining land, transportation land, water conservancy and hydropower facilities and energy facilities.

5. The method of claim 2, wherein the deep convolutional neural network model adopts a UNet++ structure and selects a ResNet50-D backbone network.

6. The method of claim 1, wherein the step of fusing the first detection result and the second detection result to obtain a change detection pattern of the target ecological protection red line region comprises:

analyzing the first detection result and the second detection result, and taking a union as a final change detection result if the two are on a same order of magnitude which indicates that the detection results are similar; and taking an intersection as a final change detection result if the two are not on a same order of magnitude.

7. A human activity recognition fusion system for ecological protection red line, comprising:

an obtaining pre-processing module, configured to obtain a pre-stage remote sensing image and a post-stage remote sensing image of a target ecological protection red line region, and to perform a data pre-processing;

an input module, configured to input the pre-processed pre-stage remote sensing image and the post-stage remote sensing image into a human activity recognition model after a pre-training, wherein the human activity recognition model uses a plurality of sets of data training, the plurality of sets of data comprises: pre-stage images and post-stage images of a red line region, and the post-stage images carry a human activity annotation;

an identification module, configured to identify a human activity pattern of the target ecological protection red line region as a first detection result;

an analyzing and processing module, configured to segment, calculate and analyze latest image data corresponding to the target ecological protection red line region based on a geographical country situation data to obtain a change pattern as a second detection result, comprising: performing a guidance segmentation on the latest image data corresponding to the target ecological protection red line region based on the geographical country situation data; calculating spectral and geometric characteristics of each segmented pattern, and obtaining the change pattern by clustering analysis and quartile spacing method as the second detection result;

a fusing module, configured to fuse the first detection result and the second detection result to obtain a change detection pattern of the target ecological protection red line region;

wherein, the described calculating spectral and geometric characteristics of each segmented pattern, and obtaining the change pattern by clustering analysis and quartile spacing method as the second detection result specifically comprises:

selecting a K-means algorithm as a clustering algorithm, adopting a similarity analysis to analyze factors of several characteristic parameters, and selecting X most heterogeneous characteristics from a plurality of characteristics to characterize the change;

calculating a median M of parameters of the most heterogeneous characteristics, finding a value Xa at 25% forward from the median M, finding a value Xb at 75% backward from the median, and a quadratic difference Mk=Xb−Xa;

taking values less than M−3*Mk and greater than M+3*Mk as a deviating region to obtain a change pattern of full sample.

* * * * *